United States Patent
Lentz

(10) Patent No.: US 10,927,974 B2
(45) Date of Patent: Feb. 23, 2021

(54) HYDRAULIC VALVE IN PARTICULAR A HYDRAULIC TRANSMISSION VALVE

(71) Applicant: ECO Holding 1 GmbH, Marktheidenfeld (DE)

(72) Inventor: Chris Lentz, Lake Orion, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 129 days.

(21) Appl. No.: 16/156,093

(22) Filed: Oct. 10, 2018

(65) Prior Publication Data
US 2019/0107219 A1   Apr. 11, 2019

Related U.S. Application Data

(60) Provisional application No. 62/570,350, filed on Oct. 10, 2017.

(51) Int. Cl.
| | |
|---|---|
| F16K 31/06 | (2006.01) |
| F16K 11/07 | (2006.01) |
| F16K 27/04 | (2006.01) |
| F16K 27/02 | (2006.01) |

(52) U.S. Cl.
CPC ...... *F16K 31/0634* (2013.01); *F16K 11/0716* (2013.01); *F16K 27/029* (2013.01); *F16K 27/048* (2013.01); *F16K 31/0613* (2013.01)

(58) Field of Classification Search
CPC ............. F16K 31/0634; F16K 31/0613; F16K 27/048; F16K 27/029; F16K 11/0716
See application file for complete search history.

(56) References Cited

U.S. PATENT DOCUMENTS

| | | | | |
|---|---|---|---|---|
| 4,538,643 A * | 9/1985 | Goedecke | ........... | F15B 13/0438 137/625.64 |
| 4,548,383 A * | 10/1985 | Wolfges | ............. | G05D 16/2024 251/29 |
| 7,841,361 B2 * | 11/2010 | Daut | ................... | F16K 31/0613 137/625.69 |
| 8,757,209 B2 * | 6/2014 | Morgan | .............. | F16K 11/0716 137/625.68 |
| 8,839,819 B2 * | 9/2014 | Holmes | ............... | F16K 11/0716 137/625.68 |
| 9,733,651 B2 * | 8/2017 | Grill | ................... | G05D 16/2013 |

* cited by examiner

*Primary Examiner* — Jessica Cahill
*Assistant Examiner* — Patrick C Williams
(74) *Attorney, Agent, or Firm* — Von Rohrscheidt Patents

(57) ABSTRACT

A hydraulic solenoid valve including a first port, a second port, a third port, a housing having at least one land between the first port and the second port, the at least one land including at least one balancing groove, and a spool that moves within the housing. The first port has a pressure higher pressure than a pressure of the second port, and the at least one centering groove is in communication with the third port. A flow of hydraulic fluid from the first port to the third port helps remove contamination from the at least one balancing groove and/or a flow of hydraulic fluid from the third port to the second port helps remove contamination from the at least one balancing groove.

11 Claims, 5 Drawing Sheets

HYDRAULIC VALVE IN PARTICULAR A HYDRAULIC TRANSMISSION VALVE

RELATED APPLICATIONS

This application claims priority from, and incorporates by reference, U.S. provisional application Ser. No. 62/570,350, filed Oct. 10, 2017.

FIELD OF THE INVENTION

The invention relates to a hydraulic solenoid valve incorporating balancing or centering grooves in the housing (snout) and in communication with a control port, and more particularly, to a hydraulic solenoid valve incorporating balancing or centering grooves in the housing and in communication with a control port that centers the spool and provides a path to help remove contamination.

BACKGROUND OF THE INVENTION

Hydraulic solenoid valves for internal combustion engines are well known in the art. Unfortunately, these know valves have problems due to contaminants affecting their operation. Accordingly, there is a need in the art to reduce contaminants and improve operation.

BRIEF SUMMARY OF THE INVENTION

An object of the invention is to provide a hydraulic solenoid valve including a first port, a second port, a third port, a housing having at least one land between the first port and the second port, the at least one land including at least one balancing groove, and a spool that moves within the housing. The first port has a pressure higher pressure than a pressure of the second port, and the at least one centering groove is in communication with the third port. The third port may have its pressure equal to the pressure of the first port or the second port, or between the pressure of the first port and the pressure of the second port. The spool travels in the housing and the at least one balancing groove is not directly exposed to an area of the first port and/or an area of the second port when the travel of the spool exceeds an average travel distance. The first port may be a supply port, the second port may be a tank port, and the third port may be a control port. The at least one balancing groove insures that the entire surface between the control port holes on the spool is open to either the first port, the second port or the balance groove during the travel of the spool. This reduces the possibility of contamination being trapped in the tight clearance between the spool and land. A flow of hydraulic fluid from the first port to the third port helps remove contamination from the at least one balancing groove and/or a flow of hydraulic fluid from the third port to the second port helps remove contamination from the at least one balancing groove. The hydraulic solenoid valve may include a one-piece configuration of a pole tube and a valve bushing where the housing is a magnetizable housing.

BRIEF DESCRIPTION OF THE DRAWINGS

Other advantages, features and details of the invention can be derived from the subsequent description of advantageous embodiments and from the drawing figures. The features and feature combinations recited in the preceding description and the features and feature combinations recited and shown individually in the figure description and in the figures are not only usable in the respectively recited combination but also in other combinations or by themselves without departing from the spirit and scope of the invention. Identical or functionally equivalent elements are designated with identical reference numerals. For reasons of clarity it is possible that elements are not designated with reference numerals in all figures without losing their association, wherein.

DETAILED DESCRIPTION OF THE INVENTION

Incorporating balancing grooves (also known as centering grooves) in a hydraulic solenoid valve assists in centering the spool in a housing (or snout). A centered spool reduces leakage but more importantly, reduces the chances of larger, problematic contamination particles getting between the spool and snout and results in more robust function in contaminated fluids. More specifically, grooves are placed in the housing inner diameter on a land between a high pressure and a low pressure, but the centering groove is always in communication with a third control port. This third control port may be at the same pressure as the high- or low-pressure area or at an intermediate pressure. To put it another way, the groove helps the pressure to be balanced between the holes in the spool and it also acts a reservoir for contamination to prevent contamination build up between the spool and housing. The flow from the supply port (high pressure) to the control port or from the control port to the tank port (low pressure) helps pull the contamination from the groove and out of the valve.

Additionally, placing the balancing grooves in the housing ensures that the groove is never directly exposed to the high- or low-pressure areas when the travel of the spool is too large and also is an improvement over placing the grooves in the spool because these grooves in the spool weaken the spool, especially at the cross holes.

Simply placing balancing grooves in the spool generally or in the housing where the balancing groove is between a high pressure and a low pressure is inferior compared to balancing grooves in the housing which in communication with a third control port or pressure area. The centering groove helps equalize the pressure between the holes in the spool and it also gives a path for contamination flow into instead of getting trapped between the spool and the housing thereby improving contamination robustness. The flow from the supply port (high pressure) to the control port or from the control port to the tank port (low pressure) helps pull the contamination from the groove and out of the valve. Without this groove, contamination can build up between the spool in the area between the spool control holes and the snout land. With the groove, the entire spool surface between the control port holes is either open to a port or the groove during spool movement. The improvement provided by the balancing grooves may be seen from the more uniform and consistent operation of the hydraulic solenoid valve as shown by the control pressure and hysteresis pressure as compared to a hydraulic solenoid valve without these features.

Figure 1:
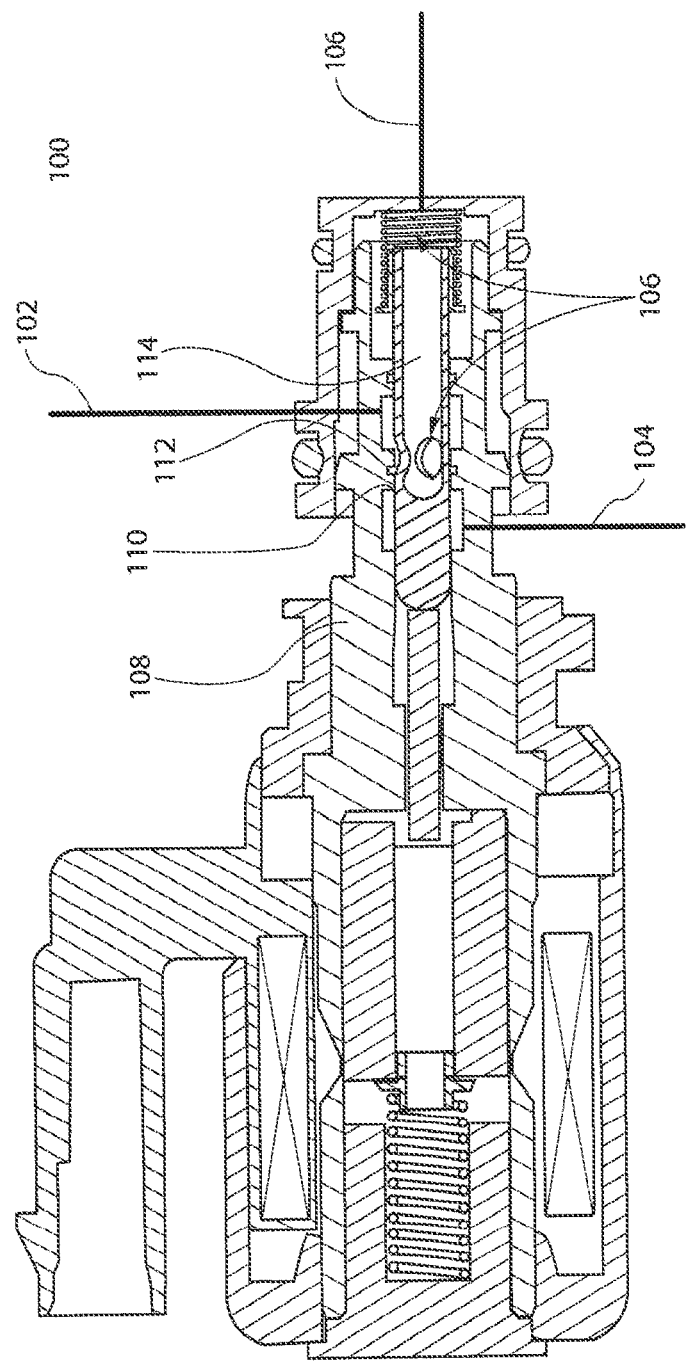
FIG. 1 illustrates an exemplary embodiment of a hydraulic solenoid valve of the invention.

FIG. 1 illustrates an exemplary embodiment of a hydraulic solenoid valve 100 including a first port 102 (e.g., a supply port) that corresponds to a high pressure for the hydraulic fluid, a second port 104 (e.g. a tank port) that corresponds to a low pressure for the hydraulic fluid, a third port 106 (e.g., a control port) that can have a pressure equal to the first port 102 or the second port 104, or that can have a pressure between the pressures of the first port 102 and the second port 106, a housing 108 having at least one land 110 between the first port 102 and the second port 104, the land 110 including at least one balancing groove 112. A spool 114 travels within the housing 108. The first port 102 has a pressure higher pressure than a pressure of the second port 104. The at least one centering groove 112 is in communication with the third port 106.

The at least one balancing groove 112 is not directly exposed to an area of the first port 102 and/or second port 104 when the travel of the spool 114 exceeds an average travel distance.

A flow of hydraulic fluid from the first port 102 to the third port 106 helps remove contamination from the at least one balancing groove 112 and/or a flow of hydraulic fluid from the third port 106 to the second port 104 helps remove contamination from the at least one balancing groove 112.

Figure 2:
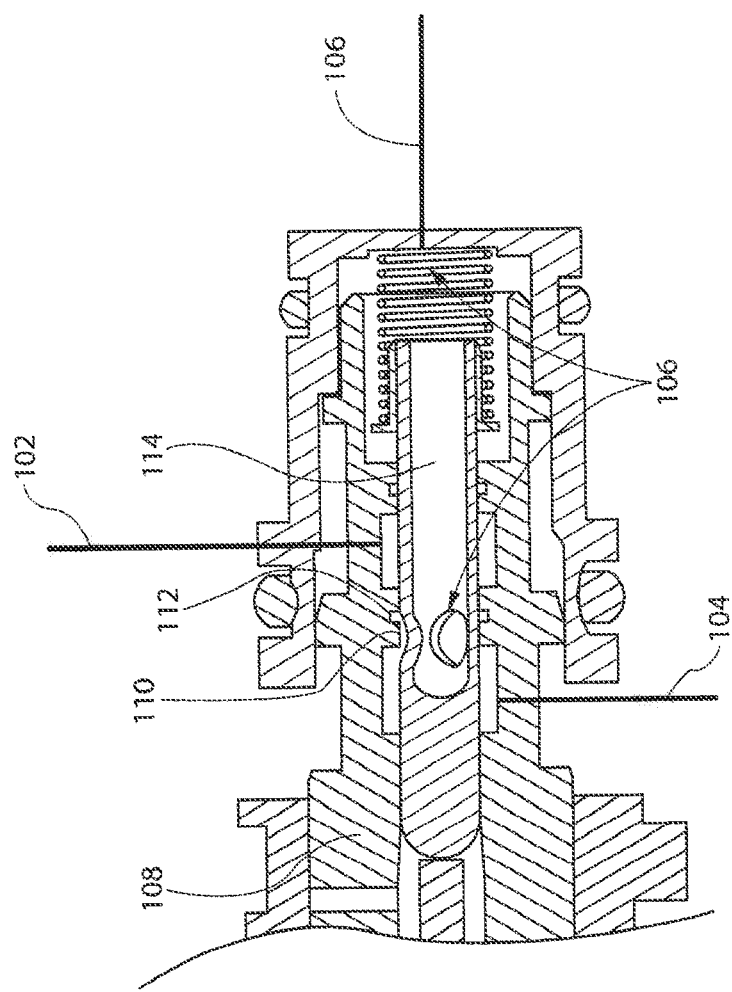
FIG. 2 illustrates a partial view of the exemplary embodiment of the hydraulic solenoid valve of the invention of FIG. 1 with the spool in a first position.

FIG. 2 illustrates a partial view of the exemplary embodiment of the hydraulic solenoid valve 100 of the invention of FIG. 1 with the spool 114 in a first position. Here the spool 114 is on the far left where a third port 106 (e.g., a control port) is in connection with a second port 104 (e.g. a tank port).

Figure 3:
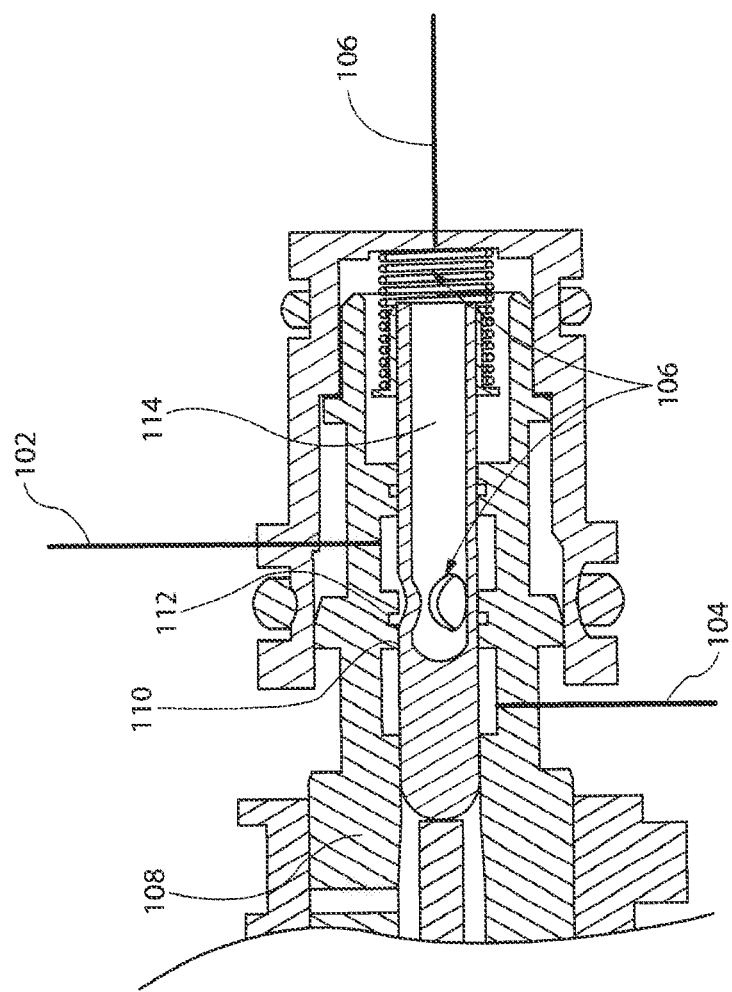
FIG. 3 illustrates a partial view of the exemplary embodiment of the hydraulic solenoid valve of the invention of FIG. 1 with the spool in a second position.

FIG. 3 illustrates a partial view of the exemplary embodiment of the hydraulic solenoid valve 100 of the invention of FIG. 1 with the spool 114 in a second position. Here the spool 114 is on the far right where a third port 106 (e.g., a control port) is in connection with a first port 102 (e.g., a supply port). The spool 114 normally travels from the first position to the second position. The distance from the first position to the second position is the maximum travel distance.

Figure 4:
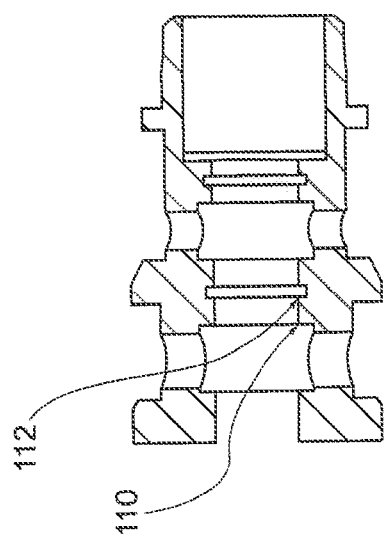
FIG. 4 illustrates an exemplary land and balancing groove of a hydraulic solenoid valve.

FIG. 4 illustrates an exemplary land 110 and balancing groove 112 in the housing of a solenoid hydraulic solenoid valve 100.

Figure 5:
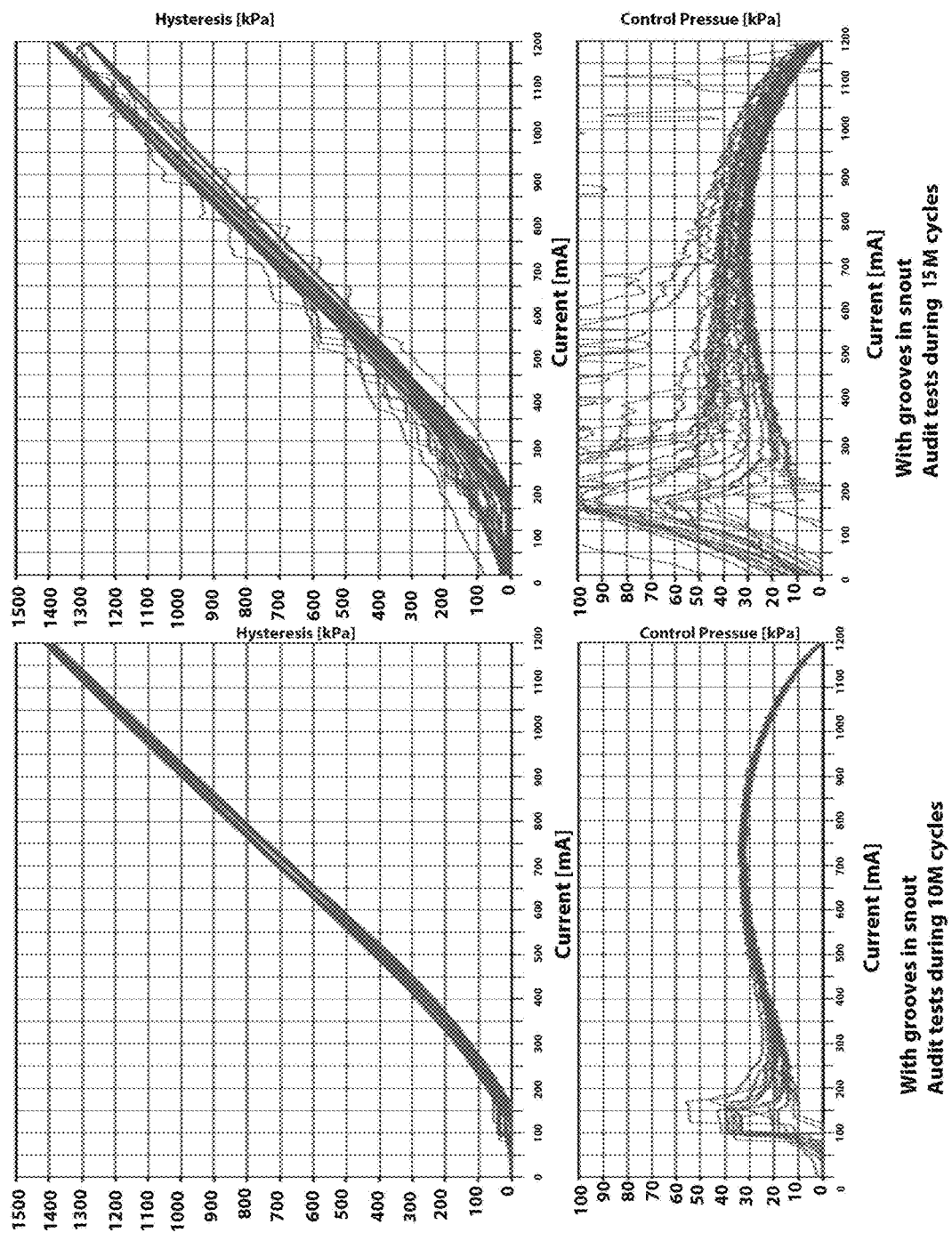
FIG. 5 shows a graph of the hysteresis and control pressure for a hydraulic solenoid valve with balancing grooves in the housing and for a hydraulic solenoid valve without balancing grooves in the housing after being exposed to contaminated oil.

FIG. 5 shows a graph of hysteresis and control pressure audit tests during contaminated oil cycling for a hydraulic solenoid valve solenoid 100 with balancing grooves 112 in the housing 108 and for a hydraulic solenoid valve without balancing grooves 112 in the housing 108. As can be easily seen, the hydraulic solenoid valve 100 with the balancing grooves 112 in the housing 108 operates better as demonstrated by the consistency of hysteresis and the control pressure.

The present invention may be incorporated into a variety of hydraulic solenoid valves. For example, by incorporating the present invention into hydraulic solenoid valves with a high level of robustness such as DE102015120981A1, which is incorporated in its entirety by this reference, a hydraulic solenoid valve with even further improved robustness may be obtained.

DE102015120981A1 is a hydraulic solenoid valve including an electromagnetic portion with a magnetizable housing which envelopes a magnet coil at an outer circumference and at least at one first face, and a pole tube that is arranged in an interior of the magnet coil wherein an armature is arranged axially movable in an armature cavity and a hydraulic portion with a hydraulic piston which is supported axially moveable in a valve bushing, and by which at least one operating connection is optionally connectable with at least one supply connection and at least one tank connection. The armature is provided to propel the hydraulic piston. The valve bushing is arranged along a longitudinal axis in an extension of the pole tube. Thus, the pole tube and the valve bushing are integrally configured in one piece. The pole tube thus includes a pole and/or a pole core of the electromagnetic portion.

The hydraulic solenoid valve with a pole tube and the valve bushing being integrally configured in one component has significant advantages for operations of the hydraulic solenoid valve since possible component deformations and resulting negative influences upon the running of the armature in the pole tube and magnetic valve hysteresis caused thereby can be reduced. An integral one-piece fabrication of pole tube and valve bushing facilitates reaching a coaxial alignment of the pole tube axis and the valve bushing axis in a much simpler manner compared to fabricating the pole tube and bushing as separate components since assembly impressions only play a minor role. Therefore, both axes can be reliably aligned already during fabrication.

The advantageous coaxial alignment of pole tube and valve bushing furthermore facilitates a reduction of the magnetic transversal forces upon the armature since a precise alignment of the armature running along the axis of the magnetic coil can be achieved in a simpler manner by the one-piece configuration of pole tube and valve bushing.

The one-piece configuration of pole tube and valve bushing furthermore facilitates a reduction of a number of components of the hydraulic solenoid valve and a consequence a simplification of assembly which leads to cost reduction and a reduction of assembly errors. Thus, the entire operation of the hydraulic solenoid valve becomes more reliable since a risk of component deformation and associated functional degradations during valve operations can be reduced. The one-piece component can be advantageously configured as a turned component.

According to an advantageous embodiment the armature can be supported in a recess of the pole tube. This way the armature can be advantageously aligned along the axis of the magnetic coil which helps efficiently driving the hydraulic solenoid valve. Through an advantageous fabrication of the pole tube as a turned component the recess can be fabricated precisely with small tolerances so that low friction travel of the armature is assured in the recess which improves response properties and operating parameters of the hydraulic solenoid valve.

The hydraulic solenoid valve according to DE102015120981A1 includes an electromagnet portion with a magnetizable housing which envelopes a magnet coil at an outer circumference and at least at a first face and a pole tube that is arranged in an interior of the magnet coil in which an armature is provided axially movable in an armature cavity. The valve bushing is arranged along a longitudinal axis in an extension of the pole tube. The magnet coil is imbedded in the coil body and receives in the housing.

A valve bushing provided integrally in one piece with the pole tube so that the hydraulic solenoid valve has a lower number of components and the assembly process can be simplified.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

COMPONENTS 100 a hydraulic solenoid valve
102 a first port
104 a second port
106 a third port
108 a housing
110 at least one land
112 at least one balancing groove
114 a spool

What is claimed is:

1. A hydraulic solenoid valve comprising:
a first port;
a second port;
a third port;
a housing having at least one land between the first port and the second port, the at least one land including at least one balancing groove; and
a spool that moves within the housing between a first position where the second port is in communication with the third port and a second position where the first port is in communication with the third port;
wherein the first port is configured to have a higher pressure than a pressure of the second port,
wherein the at least one balancing groove is in communication with the third port through an interior of the spool in the first position and in the second position of the spool,
wherein the first port is a supply port,
wherein the second port is a tank port,
wherein the third port is a control port.

2. The hydraulic solenoid valve according to claim 1, wherein the third port is configured to have a pressure equal to the pressure of the first port.

3. The hydraulic solenoid valve according to claim 1, wherein the third port is configured to have a pressure equal to the pressure of the second port.

4. The hydraulic solenoid valve according to claim 1, wherein the third port is configured to have a pressure between the pressure of the first port and the pressure of the second port.

5. The hydraulic solenoid valve according to claim 1,
wherein the spool is controllable by a solenoid to move in the housing in a range between a first position and a second position, and
wherein the at least one balancing groove is not directly exposed to an area of the first port when the travel of the spool exceeds the range.

6. The hydraulic solenoid valve according to claim 1,
wherein the spool is controllable by a solenoid to move in the housing in a range between a first position and a second position, and
wherein the at least one balancing groove is not directly exposed to an area of the second port when the travel of the spool exceeds the range.

7. The hydraulic solenoid valve according to claim 1,
wherein the spool is controllable by a solenoid to move in the housing in a range between a first position and a second position,
wherein the at least one balancing groove is not directly exposed to an area of the first port when the travel of the spool exceeds the range, and
wherein the at least one balancing groove is not directly exposed to an area of the second port when the travel of the spool exceeds the range.

8. The hydraulic solenoid valve according to claim 1, wherein a flow of hydraulic fluid from the third port to the second port is configured to remove contamination from the at least one balancing groove.

9. The hydraulic solenoid valve according to claim 1, further comprising one-piece configuration of a pole tube and a valve bushing,
wherein the housing is a magnetizable housing.

10. A hydraulic solenoid valve comprising:
a first port;
a second port;
a third port;
a housing having at least one land between the first port and the second port, the at least one land including at least one balancing groove; and
a spool that moves within the housing;
wherein the first port is configured to have a higher pressure than a pressure of the second port,
wherein the at least one balancing groove is in communication with the third port through an interior of the spool, and
wherein a flow of hydraulic fluid from the first port to the third port is configured to remove contamination from the at least one balancing groove.

11. The hydraulic solenoid valve according to claim 10, wherein a flow of hydraulic fluid from the third port to the second port is configured to remove contamination from the at least one balancing groove.

* * * * *